United States Patent [19]

van der Avoird

[11] Patent Number: 5,129,260

[45] Date of Patent: Jul. 14, 1992

[54] PLATE BRAKE TESTER

[75] Inventor: Euphratius M. van der Avoird, Lisserbroek, Netherlands

[73] Assignee: Sugiura N.V., Willemstad, Netherlands Antilles

[21] Appl. No.: 717,361

[22] Filed: Jun. 19, 1991

[30] Foreign Application Priority Data

Jun. 21, 1990 [NL] Netherlands ............. 9001413

[51] Int. Cl.⁵ .............................. G01L 5/28
[52] U.S. Cl. ................................... 73/122
[58] Field of Search .................. 73/122, 65, 12

[56] References Cited

U.S. PATENT DOCUMENTS

| | | | |
|---|---|---|---|
| 2,148,229 | 2/1939 | Bennett | 73/122 |
| 4,011,751 | 3/1977 | Weiss et al. | 73/122 |
| 5,083,456 | 1/1992 | Colarelli, III | 73/122 |

Primary Examiner—Jerry W. Myracle
Attorney, Agent, or Firm—Lorusso & Loud

[57] ABSTRACT

A plate brake tester for testing the brakes of a motor vehicle, comprises two pair of tread plates one beside the other, each of said tread plates having a measuring device for measuring the force exerted on the tread plate, a processing unit for processing measuring signals provided by the measuring devices and a display for displaying the measuring results. The plate brake tester comprises a weighing device for determining the weight of the front axle and the rear axle of the vehicle, respectively. The processing unit is adapted to compute the braking retardation from the measured brake forces and the total weight of the vehicle. The plate brake tester computes the brake force ratio front axle/rear axle from the measured brake forces and the dynamic weight ratio front axle/rear axle from the computed braking retardation, the wheelbase of the vehicle, the height of the center of gravity of the vehicle and the measured weight of the front axle and the rear axle, respectively. Further, the processing unit provides an indication through the display if said brake force ratio deviates from said dynamic weight ratio and this deviation exceeds predetermined threshold values.

6 Claims, 1 Drawing Sheet

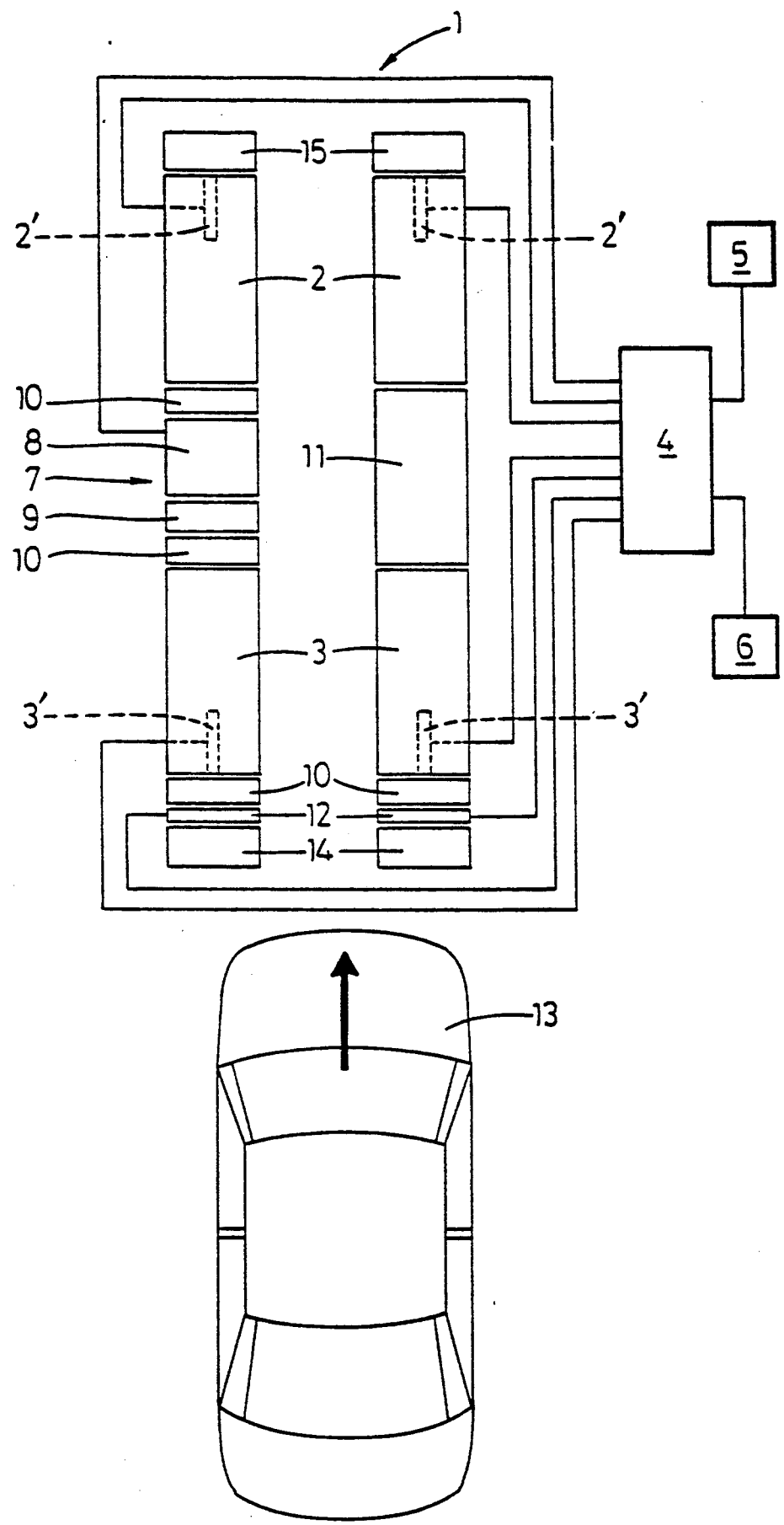

PLATE BRAKE TESTER

BACKGROUND OF THE INVENTION

The invention relates to a plate brake tester for testing the brakes of a motor vehicle, comprising two pair of tread plates one beside the other, each of said tread plates having a measuring device for measuring the force exerted on the tread plate, a processing unit for processing measuring signals provided by the measuring devices and a display for displaying the measuring results, further comprising a weighing device for determining the weight of the front axle and the rear axle of the vehicle, respectively, said processing unit being adapted to compute the braking retardation from the measured brake forces and the total weight of the vehicle.

Such an apparatus is very suitable for testing the brakes of a motor vehicle, because the brakes are tested under circumstances as will also occur during braking on the road. An important criterion for evaluating the operation of the brakes of a vehicle is the ratio of the braking forces exerted by the front wheels and the braking forces exerted by the rear wheels, which ratio can be indicated as brake force ratio front axle/rear axle. In many countries the government requires that this brake force ratio is in any case such that during braking on the road the front wheels will always be the first to skid. For these reasons car manufacturers choose a brake force ratio with such a safety margin that rear wheel skid cannot occur. However this results in a lower maximum obtainable braking retardation because the brake force which can be transfered by the rear wheels on the road is lower than the dynamic weight on the rear wheels. Up to the present there is no brake tester available by means of which a test of the brakes of a motor vehicle can be done in simple and for the garage industry economic manner in order to check whether the brake force ratio meets certain requirements like for example the requirements of the government.

SUMMARY OF THE INVENTION

The invention aims to provide a plate brake tester which meets the want for such a brake tester and by means of which the brake force ratio can be tested in a simple manner.

To this end the plate brake tester of the invention is characterised by means for computing the brake force ratio front axle/rear axle from the measured brake forces and means for computing the dynamic weight ratio front axle/rear axle from the computed braking retardation, the wheelbase of the vehicle, the height of the center of gravity of the vehicle and the measured weight of the front axle and the rear axle, respectively, wherein the processing unit provides an indication through the display if said brake force ratio deviates from said dynamic weight ratio and this deviation exceeds predetermined threshold values.

In this manner a plate brake tester is obtained, by means of which the brake force ratio can be compared quickly with the optimum brake force ratio for this vehicle, i.e. the dynamic weight ratio. For the maximum brake force which can be transfered by a wheel to the road equals the vertical force (the weight), exerted by this wheel on the road. Due to the diving tendency of the motor vehicle during braking the maximum vertical forces which can be exerted by the wheels, are therefore determined by the dynamic weight ratio of the motor vehicle.

According to a favourable embodiment the processing unit provides an indication through the display if the deviation between said brake force ratio and the dynamic weight ratio showes that the rear wheels lock before the front wheels.

According to a prefered embodiment the processing unit indicates said brake force ratio and, said dynamic weight ratio as optimum brake force ratio on the display.

BRIEF DESCRIPTION OF THE DRAWING

The invention will be further explained by reference to the drawing in which an embodiment of a plate brake tester according to the invention is schematically shown.

DETAILED DESCRIPTION OF A PREFERRED EMBODIMENT

The plate brake tester 1 shown comprises two pair of tread plates 2 and 3, respectively. These tread plates 2,3 are provided with measuring devices 2', 3' schematically shown and by means of which the force exerted on the tread plates can be measured and converted into an electrical signal. These measuring devices 2', 3' can for example be made as stretching or bending bar with strain gauges, as electromagnetic transducer or the like. As schematically indicated by connection lines the measuring devices are connected to a processing unit 4 for processing the measuring signals provided by the measuring devices. This processing unit 4 further comprises a display 5 and a keybord 6.

The plate brake tester 1 shown further is provided with a so-called side-slip measuring device 7, including a measuring plate 8 at the left and a preceding compensation plate 9, which plates 8,9 are preceded and followed, respectively, by a coupling plate 10. At the right the side-slip measuring device 7 includes an auxiliary plate 11.

Further the plate brake tester 1 is provided with a weighing device 12 for measuring the weight at the front axle and rear axle, respectively, of a vehicle 13. The weighing device 12 is preceded by ramp plates 14 and followed by coupling plates 10. At the other end of the plate brake tester 1 ramp plates 15 are provided.

The plate brake tester 1 has the important advantage that a dynamic test can be made, i.e. a test under circumstances comparable with the circumstances on the road.

In normal use of the plate brake tester a measurement is started in that the force exerted on the tread plates 2 intended for the front wheels exceeds a certain threshold value whereafter the forces exerted on the tread plates 2, 3 are measured by the processing unit during a predetermined measuring period, for example 750 ms. The processing unit 4 is adapted to check if the forces exerted meet the minimum braking retardation legally required and entered as a parameter through the keybord 6.

The braking retardation is computed by the processing unit 4 from the total of the measured brake forces divided by the weight of the motor vehicle 13. Further it is now possible to compute the dynamic weight ratio by means of the weight at the front axle and the rear axle, respectively, of the vehicle 13 measured by the weighing device 12, from the braking retardation, the wheelbase of the vehicle 13 and the height of the center of gravity of the vehicle 13. For the weight displacement ΔQ it applies:

$$\Delta Q = \frac{D \times P \times h}{e}$$

in which D is the braking retardation in g, P is the total vehicle weight, h is the height of the center of gravity of the vehicle and e is the wheelbase. The dynamic weight at the front axle and the rear axle, respectively, is then $P+\Delta Q$ and $P-\Delta Q$, respectively.

Further the processing unit 4 computes the brake force ratio front axle/rear axle from the measured brake forces. Thereby this brake force ratio can be compared with the dynamic weight ratio front axle/rear axle. As the maximum brake force which can be transfered by a wheel to the road, equals the vertical force, i.e. the weight of the respective wheel, the dynamic weight ratio actually corresponds with the optimum brake force ratio. Therefore the processing unit 4 showes through the display 5 besides the brake force ratio, the dynamic weight ratio as optimum brake force ratio so that the user can determine in which manner the measured brake force ratio deviates from the optimum brake force ratio.

The government usually requires that the rear wheels will not skid before the front wheels. When a comparison of the brake force ratio and the dynamic weight ratio showes that the rear wheels would lock before the front wheels, the processing unit 4 will then indicate this through the display 5.

Further the processing unit 4 can indicate through the display 5 if the measured brake force ratio deviates more from the dynamic weight ratio than a predetermined threshold value. This threshold value may for example be 15 points. Further the processing unit 4 can indicate through the display 5 if the rear wheels provide less than 10% of the total brake force.

In order to provide a better explanation the following example can be given:
weight motor vehicle: 1000 kg
weight front axle: 600 kg
weight rear axle: 400 kg During the brake test by means of the plate brake tester 1 a total brake force of 6000 N is measured, wherein the front axle provides a brake force of 5100 N and the rear axle a brake force of 900 N. From this measurement it follows for the brake force ratio front axle/rear axle in per cents 85/15. The braking retardation amounts 6 m/s².

With this braking retardation a dynamic weight ratio of 72/28 can be computed from the static weight ratio 60/40 by means of the wheelbase and the height of the gravity center. This means that in the example the contribution of 85% by the front wheels in the total brake force is 13 points higher than the part of the weight at the front axle of 72%. As the brake force provided by the front wheels is higher than the vertical force exerted by the front wheels, the front wheels will block first.

The processing unit 4 reads the wheelbase in a memory by means of the determined total weight of the motor vehicle. Further a fixed value of 0,55 m is taken for the height of the center of gravity. If desired the wheelbase and the real height of the center of gravity can be entered through the keyboard 6. Further the Cw-value of the motor vehicle 13 can be entered through the keyboard 6 so that the dynamic weight ratio can be computed at a speed of for example 90 km/hour, wherein the effect of the wind caused by driving is taken into account.

The invention is not restricted to the abovedescribed embodiment which can be varied in a number of ways within the scope of the following claims.

I claim:

1. Plate brake tester for testing the brakes of a motor vehicle, comprising two pair of tread plates one beside the other, each of said tread plates having a measuring device for measuring the force exerted on the tread plate, a processing unit for processing measuring signals provided by the measuring devices and a display for displaying the measuring results, and further comprising a weighing device for determining the weight of the front axle and the rear axle of the vehicle, respectively, said processing unit being adapted to compute the braking retardation from the measured brake forces and the total weight of the vehicle, wherein means are provided for computing the brake force ratio front axle/rear axle from the measured brake forces and means for computing the dynamic weight ratio front axle/rear axle from the computed braking retardation, the wheelbase of the vehicle, the height of the center of gravity of the vehicle and the measured weight of the front axle and the rear axle, respectively, wherein the processing unit provides an indication through the display if said brake force ratio deviates from said dynamic weight ratio and this deviation exceeds predetermined threshold values.

2. Plate brake tester according to claim 1, wherein the processing unit provides an indication through the display if the deviation between said brake force ratio and the dynamic weight ratio shows that the rear wheels lock before the front wheels.

3. Plate brake tester according to claim 1, wherein the processing unit indicates said brake force ratio and said dynamic weight ratio as optimum brake force ratio on the display.

4. Plate brake tester according to claim 1, wherein the processing unit provides an indication through the display if the brake force of the rear wheels is less than for example 10% of the total brake force.

5. Plate brake tester according to claim 1, wherein the processing unit derives the wheel base of the vehicle from a table stored in a memory by means of the measured vehicle weight wherein a predetermined value is taken for the height of the gravity center of the vehicle.

6. Plate brake tester according to claim 1, wherein said means for computing the dynamic weight ratio front axle/rear axle compute said weight ratio for a driving speed of 90 km/hour.

* * * * *